Oct. 28, 1952 — E. A. RING — 2,615,163

NONFRACTURABLE LENS FOR GOGGLES

Filed June 10, 1949

Inventor:
Ernest A. Ring
By
Attorneys.

Patented Oct. 28, 1952

2,615,163

UNITED STATES PATENT OFFICE 2,615,163

NONFRACTURABLE LENS FOR GOGGLES

Ernest A. Ring, Providence, R. I., assignor to Watchemoket Optical Co., Inc., Providence, R. I., a corporation of Rhode Island Application June 10, 1949, Serial No. 98,207

6 Claims. (Cl. 2—14)

This invention relates to goggles for protection to the eyes of workers in industrial plants, for example, machinists, foundrymen, chippers, welders, stone-cutters and other artisans exposed to flying particles; and particularly for protecting the eyes of the military from the impact of fragments of exploding shells, projectiles and the like.

One object of the invention is to provide a sturdy, shock-proof goggle affording maximum protection to the eyes from practically all angles without obstructing the range of vision in any direction.

Another object is to provide a goggle with shock-proof lenses highly resistant to and proof against shattering and splintering under severe impact of flying particles of metal, abrasives and the like.

Another object of the invention is to provide a goggle having non-fracturable lenses resistant to the impact of pointed projectiles and sharp steel fragments projected thereagainst at high speed.

Another object is to provide an improved goggle with the optical element thereof composed of successive layers of transparent material having certain of the laminations separated by an unsealed air space providing a cushion therefor.

Further objects of the invention are set forth in the following specification which describes a preferred form of construction of the improved goggle, by way of example, as illustrated by the accompanying drawing. In the drawing.

Figure 1:
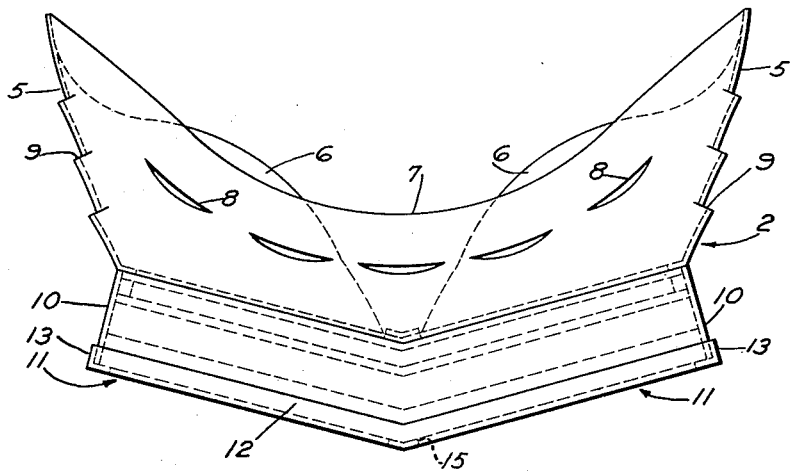
Fig. 1 is a top plan view of the present improved goggle.

The present invention is the result of extensive research and experimentation directed to solving the problem of producing an improved goggle having an anti-fragmentation optical element of maximum resistance for military use under fire or during battle practice.

Referring to the drawing, the present improved goggle preferably comprises a metal frame 2 of high test sheet-steel with a sight opening at the front for the optical element 3 which is of laminated structure. The metal frame 2 may be of generally hollow, hood-shape having its top wall slightly convexed upwardly and extended downwardly in side enclosures 5 with its bottom portion constituted by two wings 6, 6. The rearward edge 7 of the frame is shaped to conform to the forehead of the wearer and the lower wings 6 are spaced apart at the center to bridge the nose. Suitable vents 8 and 9 along the top and sides of the frame 2 provide for its ventilation and the edges which contact the face may be suitably padded to render the frame more comfortable to wear, a strap or the like (not shown) being attached to the sides of the frame for encircling the head to hold it in place.

The present invention relates particularly to the improved optical element 3 of the goggle which is constructed and arranged as next described. The sight-opening at the front of the frame 2 is provided with a forwardly-projecting box-like enclosure 10 for receiving the optical unit or lens 3 which is preferably shaped with rectangular eye-pieces sloping from the center at an inclination with the rearward included angle of substantially 150°. A metal bezel 11 having its lateral portions of the same inclination is fastened to the front of the box-like portion 10 of the frame 2 with its top strip 12, sides 13 and bottom length 14 of angular flanged construction joined at the center by a beveled strip 15.

The optical element 3 is composed of successive layers or laminations of clear, transparent, plastic sheet-material such as cast resins possessing the characteristics hereinafter specified. The forward portion of the optical element 3 is constituted by two layers 16 and 17 of sheet-material such as methyl methacrylate with the rectangular side panels thereof sloping from the center at the same angle as that of the bezel 11 to adapt them to fit within the box-like frame part 10. The bezel 11 overlaps the rim and is suitably secured to the box-like portion 10 of the frame 2 by welding or otherwise. The two layers or laminations 16 and 17 of the methyl methacrylate or similar material are preferably of substantial thickness, for example 1/4" in cross-section to give them the necessary strength and rigidity.

Overlying the rearward face of the second layer 17 is a thinner lamination 18 of cellulose acetate or similar material of the same shape and dimensions with its edges confined within the enclosure 10 of the frame 2. A fourth strip 19 of cellulose acetate or the like of the same thickness as the strip 18 is offset in spaced relation to the rear thereof to provide an air cushion 20 between these two strips. The fourth strip 19 is spaced from the strip 18 by means of a rectangular hollow washer constructed of horizontal strips of wood 21 at the top and bottom, vertical side strips 22 and a pair of vertical strips or splints 23 at the center, see Figs. 2, 3 and 4. In place of the strips of wood, last described, other material may be employed for forming the rectangular washer or spacer between the layers 18 and 19.

Figure 2:
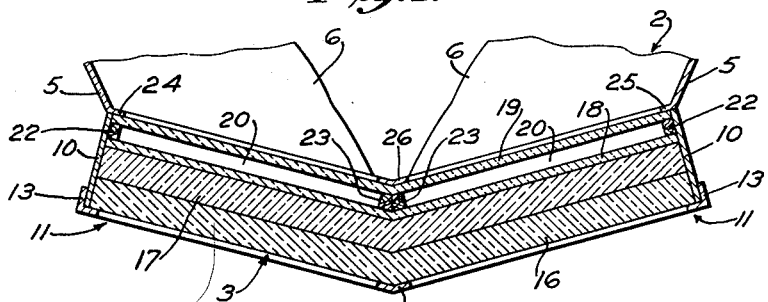
Fig. 2 is a transverse sectional view of the optical element of the goggle.
Figure 3:
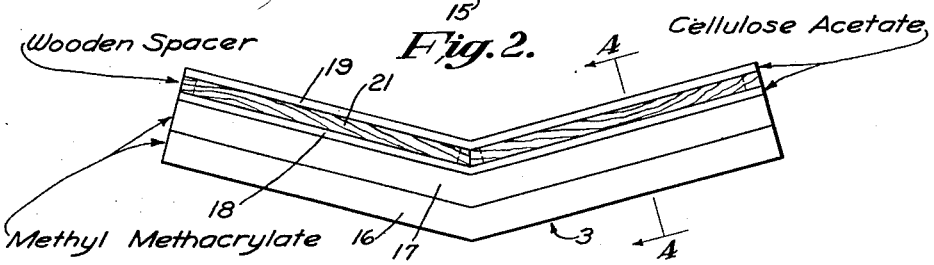
Fig. 3 is a top plan view of the same.
Figure 4:
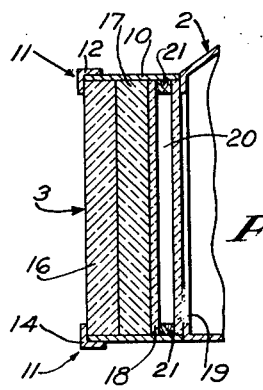
Fig. 4 is a sectional view of the optical element taken on line 4—4 of Fig. 3.

It will be observed by reference to Fig. 2 that the final or inner strip 19 of cellulose acetate abuts flanged portions 24 and 25 of the metal folded inwardly from the sides of the main frame 2, while being further supported at the center by a vertical beveled strip 26 of metal shown in Figs. 2 and 4. With the several laminations of the optical element 3 assembled in the manner described above and held in place by the marginal portions of the bezel 11 a substantially unitary structure is provided capable of resisting considerable stress and strain and also substantialy proof against fracture and fragmentation.

The angular arrangement of the panels of the optical element 3 provides for wide range of vision and also protection from the impact of sharp fragments striking thereagainst at varying angles. The relatively thick forward laminations or layers 16 and 17 of methyl methacrylate or the like provide optically-perfect transparency for clear vision and the cellulose acetate strips 18 and 19 also have equal characteristics for this purpose. The two thicker forward layers 16 and 17 take the brunt of the impact when subjected to the flight of metal fragments or sharp missiles projected thereagainst at high rates of speed, while the thinner layers 18 and 19 enclose the air-space 20 to provide for a yielding action to cushion the shock of the blows.

The methyl methacrylate in the two forward layers 16 and 17 is substantially infrangible and practically proof against splintering or fragmentation whereof to give maximum protection against the impact of sharp metal fragments and even projectiles fired thereagainst at high speed. It is to be understood, however, that other materials having the same characteristics as those specified, such as well-known allied cast resins may be substituted for the methyl methacrylate; and likewise, hard vinyl sheeting or similar resins may be substituted for the cellulose acetate in the inner layers 18 and 19.

It has been demonstrated that by the use of the materials specified, and others having the same characteristics, for the laminations combined in the arrangement shown and described the optical element will stop a 17 grain wedge-pointed steel projectile at speeds in excess of 1500 feet per second; a result never before attained in a goggle. In fact, during a series of supervised tests conducted recently, in several rounds fired at a speed of from 1610 feet a second to 1705 feet a second, projectiles failed to penetrate completely through the several layers of the optical element of the goggle, and up to a speed of 1600 feet a second projectiles even failed to penetrate through the first two layers of the methyl methacrylate layers when fired at angles of 12° 30′ to normal. From this demonstration it is apparent that the present goggle with its novel and improved construction of the optical element provides an extremely high ratio of protection for military use besides being much more efficient than ordinary goggles for industrial use.

While the invention is herein shown and described as embodied in a preferred form of construction, various modifications may be made in the shape and arrangement of the parts of the frame and optical element therefor without departing from the spirit or scope of the invention as expressed in the following claims. Therefore, without limiting myself in this respect, I claim:

1. For use in a goggle or the like, an optical element comprising two forwardly-disposed relatively thick layers of transparent material in face-to-face contact, the material of said two layers being capable of resisting penetration under the impact of projectiles or other missiles impelled thereagainst, a third layer of thinner transparent material overlying the rearward face of the second layer in contact therewith, a fourth layer of relatively thin transparent material spaced rearwardly from the third layer, and means disposed between the third and fourth layers to hold them in spaced relationship to form an air-cushion therebetween.

2. In a goggle having a sight opening at the front, the combination therewith of an optical element comprised of a plurality of laminations consisting in two forward layers of relatively thick transparent material in face-to-face contact, the material of said forward layers being highly resistant to penetration or shattering under the impact of projectiles or metal particles hurled thereagainst, a third layer of transparent material in contact with the rearward face of the second layer, a fourth layer of relatively thin transparent material spaced laterally from the third layer, and a hollow washer between said third and fourth layer to maintain them in permanently spaced relationship to form an air-cushion therebetween.

3. A goggle having a sight opening at the front enclosed by a box-like frame, a plurality of layers of transparent sheet-material enclosed within the sides of said frame, the two forward layers being of considerable thickness in cross-section and resistant to splintering, shattering and penetration under the impact of missiles impelled thereagainst at high velocity, a thinner layer of transparent sheet-material overlying the rearward face of the second layer in contact therewith, a fourth layer of transparent sheet-material of substantially the same thickness as the third layer spaced rearwardly therefrom, a hollow washer separating said two rearward layers to provide an air-cushion therebetween, and a bezel surrounding the marginal portions of the frame for retaining the optical element therein.

4. In a goggle or the like, a transparent optical element comprising two forwardly-disposed relatively thick layers of methyl methacrylate having their adjacent faces in contact, a third layer of thinner material such as cellulose acetate overlying the rearward face of the second layer in contact therewith, a fourth layer of cellulose acetate spaced rearwardly from the third layer, and spacing means separating the third and fourth layers to form an air-cushion therebetween.

5. In a goggle comprising a hood-like frame provided with a rectangular sight opening at the front bounded by a box-like enclosure, a laminated optical element enclosed within the box-like portion of the frame, said element comprising two layers of transparent sheet material of considerable thickness disposed in face-to-face contact, a third thinner layer of transparent material overlying the rearward face of the second layer, a fourth layer of transparent material spaced rearwardly from the third layer, means for maintaining said third and fourth layer in spaced relationship, and a bezel surrounding the outer edges of the frame in contact with the outer layer of the optical element to secure the latter in the frame.

6. In a goggle, a hood-like frame having a rectangular opening at the front bounded by a box-like section with outwardly-flaring sides, a laminated optical element fitted within said box-like section of the frame, said optical element comprised of four layers of transparent material of substantially rectangular shape in outline with divergent side panels, the two forward layers being of substantial thickness and arranged in face-to-face contact, a third layer of thinner transparent sheet-material overlying the rearward face of the second layer, a fourth layer of transparent sheet-material of substantially the same thickness as the third layer and spaced rearwardly therefrom, means for maintaining said third and fourth layers in spaced relation at the sides and top and bottom of the panels, and means to fasten said optical element in the frame and maintain the layers thereof in the relationship specified.

ERNEST A. RING.

REFERENCES CITED

The following references are of record in the file of this patent:

UNITED STATES PATENTS

| Number | Name | Date |
|---|---|---|
| 1,848,190 | Morgan | Mar. 8, 1932 |
| 1,905,210 | Bowers | Apr. 25, 1933 |
| 2,079,048 | Spencer | May 4, 1937 |
| 2,322,310 | Muskat et al. | June 22, 1943 |